(12) United States Patent
Sekine

(10) Patent No.: US 6,289,257 B1
(45) Date of Patent: Sep. 11, 2001

(54) METHOD AND APPARATUS FOR ANALYZING CORRELATION FOR SEMICONDUCTOR CHIPS

(75) Inventor: Hiroaki Sekine, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/262,009

(22) Filed: Mar. 4, 1999

(30) Foreign Application Priority Data

Mar. 6, 1998 (JP) .................................................. 10-055581

(51) Int. Cl.$^7$ .................................................. G06F 19/00
(52) U.S. Cl. .......................... 700/121; 700/108; 700/109; 700/110; 700/117; 702/35; 702/81; 702/84; 702/182; 438/14; 438/15; 438/16
(58) Field of Search .............................. 700/32, 108, 109, 700/110, 117, 121; 702/35, 81, 84, 182–186; 438/14–16

(56) References Cited

U.S. PATENT DOCUMENTS

| | | | |
|---|---|---|---|
| 4,415,629 | * 11/1983 | Waite | 705/28 |
| 4,809,196 | * 2/1989 | Miller | 436/4 |
| 5,512,842 | * 4/1996 | Kida | 324/765 |
| 5,619,596 | * 4/1997 | Iwaki et al. | 382/278 |
| 5,963,881 | * 10/1999 | Kahn et al. | 702/35 |
| 6,108,586 | * 8/2000 | Suzuki et al. | 700/117 |
| 6,115,643 | * 9/2000 | Stine et al. | 700/110 |

OTHER PUBLICATIONS

A. Wong, "Statistical Micro Yield Molding", *Semiconductor International*, Nov. 1996, pp. 139–148.

* cited by examiner

*Primary Examiner*—William Grant
*Assistant Examiner*—Ramesh Patel
(74) *Attorney, Agent, or Firm*—Staas & Halsey, LLP

(57) ABSTRACT

A systematic yield Ysi is obtained from a yield Yi, Wafer data through are sorted in numeric order of a monitored quantity X, the sorted data is classified into m groups each having approximately equal number of data, the central value is obtained for each of X and Ys in the respective wafer groups, a correlation coefficient between X and Ys is calculated for the central values, and if the coefficient is greater than a predetermined value, a regression equation of Ys with respect to X is determined. The processes of the steps 30 through 34 are performed for a number of monitored quantities. In a case where the coefficient of the correlation between X and Ys is more than a predetermined value, this X is selected and a multiple regression equation of Ys with respect to only the selected ones is determined.

18 Claims, 13 Drawing Sheets

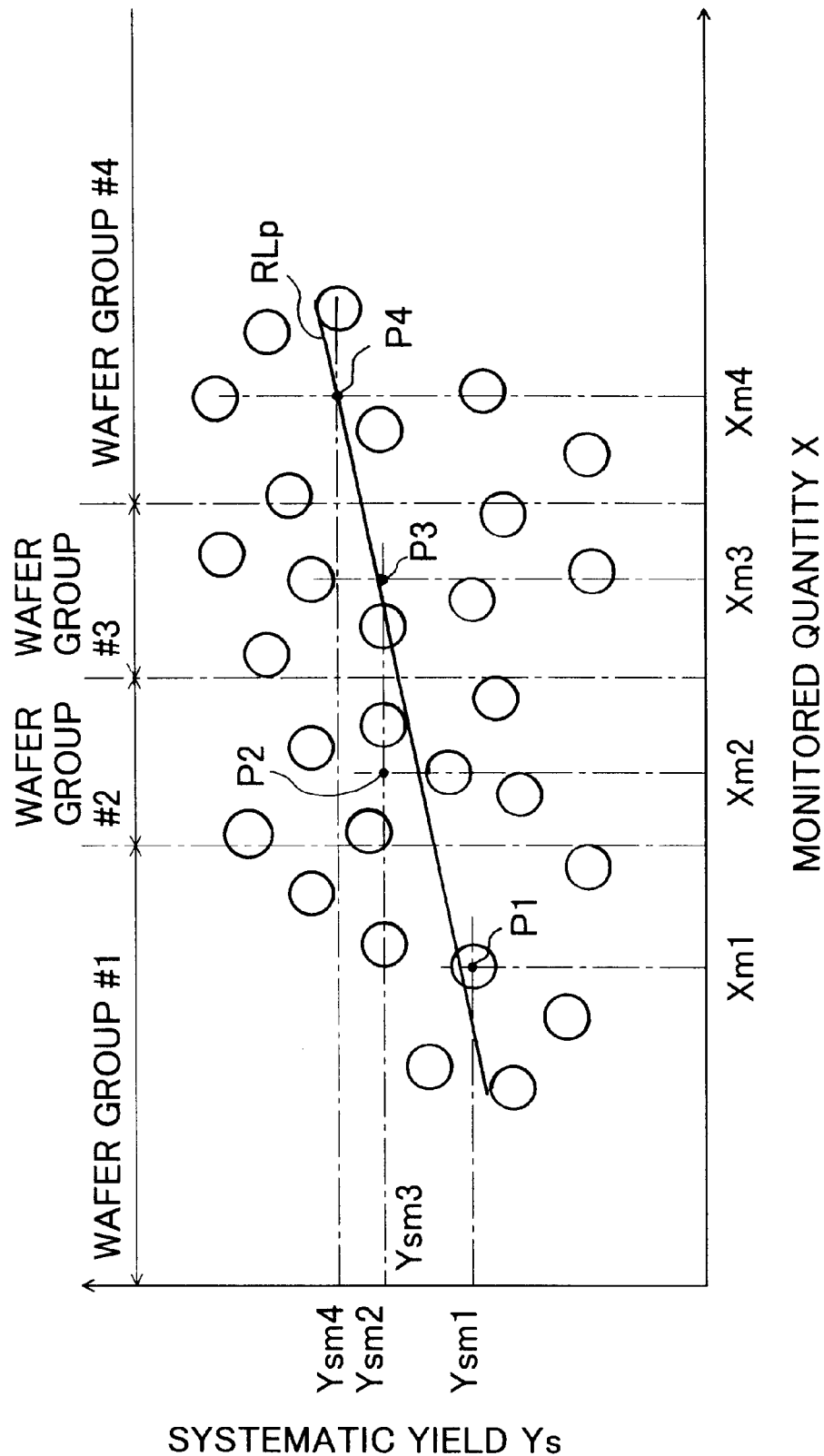

METHOD AND APPARATUS FOR ANALYZING CORRELATION FOR SEMICONDUCTOR CHIPS

BACKGROUND OF THE INVENTION

1. Field of the Invention

The present invention relates to a method and an apparatus for analyzing a correlation for semiconductor chips; a semiconductor chip yield adjusting method using the same; and a storage medium for storing program for carrying out the analyzing method. The correlation may be one between the good or defective product ratio of semiconductor chips and a monitored quantity which is a physical quantity in the semiconductor chips or a state quantity of an apparatus for producing semiconductor chips. The correlation may be another one between a geometrically physical quantity of a device in the semiconductor chips, which is a kind of monitored quantity, and an electrically physical quantity which is a kind of monitored quantity in the semiconductor chips.

2. Description of the Related Art

A method for analyzing a correlation for semiconductor chips has become an important technology in order to improve the product yield of mass-produced semiconductor chips in a short period.

Even though semiconductor chips are mass-produced with various kinds of established conditions of a semiconductor chip manufacturing process, the concentration of impurities, wiring width and film thickness are made uneven due to variation of practical conditions, thus product yield thereof may change. Therefore, an quantity X pertaining to semiconductor chips or the production thereof is monitored, and data of sets of the monitored quantity X and yield Y are collected, wherein the data are statistically analyzed in order to determine a correlation between the monitored quantity X and yield Y. Thereby, the monitored quantity X is made to change so as to improve the yield Y.

In the literature, Allan Wong, "Statistical Micro Yield Modeling", Semiconductor International, November 1996, p.139–148, the following method for analyzing a correlation with respect to semiconductor chips is disclosed.

In FIG. 10, n wafer data (Xj, Yj), for j=1 through n, of sets of the monitored quantity X and yield Y are obtained for n wafers 11 through 1n, wherein Xj is the mean value of electrical test results with respect to a plurality of semiconductor chips on the wafer 1j.

Yj includes a random yield component Yr caused by, for example, defective short circuiting between conductors due to contamination. Since the random yield Yr has no relation to the correlation between the monitored quantity X and yield Y, it is necessary to eliminate the random yield Yr by separating the random yield Yr from non-random components (systematic yield) Ys. The following equation;

$$Y = Yr * Ys, \quad Yr = EXP(-S*D) \quad (1)$$

is established, where S is the area of a chip, D is a defect density which means the number of defects per unit area, and * is a multiplying operator.

The following equation can be obtained from the above equation (1).

$$Log(Y) = Log(Ys) - S*D \quad (2)$$

Since Ys and D do not depend on the value of S, If S can be changed, Log(Y) becomes log(Ys) at S=0 on a straight line expressing a relationship between Log(Y) and S, thereby Ys can be obtained. In order to calculate yield Y, it is assumed that i chips adjacent to each other is a hypothetical chip having an area S=i*A, wherein if any one of the i chips is defective, the hypothetical chip is regarded as defective.

For example, in FIG. 11(A), it is assumed that rectangles marked with a cross 'X' are defective chips. Y=72/75 if S=A. If S=3A, for example, it is assumed that, sets (4, 5, 6), (2, 5, 8), (2, 5, 4), (4, 5, 8) and (8, 5, 6) of three chips including chip 5 and adjacent to each other are all independent hypothetical chips different from each other.

As shown in FIG. 11(B), the relationship between S and Log(Y) is linearly approximated by the least square method in order to obtain a systematic yield Ys.

Thus, with respect to each of the yields of Y1 through Yn of wafers 11 through 1n in FIG. 10, from which the random yield is separated, and the systematic yields Ys1 through Ysn are obtained.

A scatter diagram of monitored quantity X to systematic yield Ys becomes as shown, for example, in FIG. 13, wherein since dots are scattered, the correlation between the monitored quantity X and the systematic yield Ys is unclear. This is because only one monitored quantity X is taken into consideration although the systematic yield Ys depends on many parameters. Simultaneously taking many parameters into consideration, the correlation may be made clearer. However, since there are parameters which are not measured or those which are difficult to measure, the correlation may not be made completely clear. Furthermore, since semiconductor chips are produced through a number of processes and the number of parameters is more than 100, it is not easy to know that which parameters should be changed and how much they should be changed in order to increase yield.

In the above-mentioned literature, the following process is performed to solve this problem.

(1) As shown in FIG. 12, wafer data (X1,Ys1) through (Xn, Yn) are sorted in ascending numeric order of the systematic yield Ys and are classified into four wafer groups #1 through #4 so that the number of data in the respective groups becomes approximately the same. This corresponds to dividing the number of data into four along the dashed lines parallel to the X-axis in a dispersion view of FIG. 13.

(2) The central values Q1 through Q4 are, respectively, obtained from the wafer groups #1 through #4. The central values Q1 through Q4 are the mean value or the median.

(3) A correlation coefficient between the monitored quantity X and systematic yield Ys is obtained with respect to only the central values Q1 through Q4 of the wafer groups. If the correlation coefficient value is more than a predetermined value, it is regarded that the correlation between the monitored quantity X and the systematic yield Ys is intensive.

(4) The above-mentioned processes (1) through (3) are carried out with respect to a number of monitored quantities X. By selecting only the monitored quantity X for which the correlation is regarded to be intensive in (3), the number of parameters is decreased, and a multiple regression equation of the systematic yield YS with respect to the selected monitored quantities is obtained.

However, when a regression line RLq about the central values Q1 through Q4 of the wafer groups thus obtained is determined, the inclination thereof is rather large. In a case where the regression line RLq is parallel to the systematic yield axis Ys, it is considered that the systematic yield Ys is in no relation to a change of the monitor value X. Therefore, even though it is attempted to increase the systematic yield Ys by changing the monitored quantity X on the basis of the regression line RLq having such greater inclination, the purpose may not be achieved in general. That is, with a prior art method for analyzing a correlation for semiconductor chips, it is possible to grasp, at a low degree of certainty, how the systematic yield changes when the monitored quantity is changed. Furthermore, the reliability of a correlation coefficient between the monitored quantity and the systematic yield is low. This is the same in cases where, instead of the systematic yield Ys, other good or defective product ratio such as a systematic defective product ratio (1−Ys), the yield Y from which Ys is not yet separated or a defective product ratio (1−Y) are used.

SUMMARY OF THE INVENTION

In view of such problems, it is an object of the present invention to provide a method and apparatus for analyzing a correlation for semiconductor chips, by which a relationship between changes of a monitored quantity and a good or defective product ratio can be grasped at a higher degree of certainty, a semiconductor chip yield adjusting method using the same, and a storage medium in which program to carry out the analyzing method is stored.

It is another object of the present invention to provide a method and apparatus for analyzing a correlation for semiconductor chips, by which a correlation coefficient between a monitored quantity and a good or defective product ratio can be gotten at a higher degree of certainty, a semiconductor chip yield adjusting method using the same, and a storage medium in which program to carry out the analyzing method is stored.

In the 1st aspect of the present invention, there is provided a method for analyzing a correlation for semiconductor chips, comprising the steps of: measuring a physical quantity of semiconductor chips or a state quantity of an apparatus for producing the semiconductor chips as a monitored quantity, the semiconductor chips being produced under approximately same conditions and being divided into sets each of which has a plurality of semiconductor chips; determining substantially a good or defective product ratio for each of the sets; classifying data of combination of the good or defective product ratio and corresponding the monitored quantity into a plurality of groups based on numeric order (i.e. increasing or decreasing numeric order) of the monitored quantity; determining central values of the good or defective product ratio and the monitored quantity for each of the groups; and calculating a correlation coefficient between the central values of the good or defective product ratio and the central values of the monitored quantity.

With the 1st aspect of the present invention, since data are classified into groups in numeric order of the monitored quantity X, it would be possible to obtain a correlation coefficient of higher certainty than in a prior art method in which the data are classified into groups in numeric order of the yield Y.

In the 2nd aspect of the present invention, there is provided a method for analyzing a correlation for semiconductor chips according to claim 1, wherein the classifying comprises the steps of: sorting the combination data in numeric order of the monitored quantity; and classifying the combination data so that the number of the combination data belonging to each of the groups is approximately equal among the groups.

In the 3rd aspect of the present invention, there is provided a method for analyzing a correlation for semiconductor chips according to claim 2, wherein each of the groups partially overlaps with adjacent one of the groups.

In the 4th aspect of the present invention, there is provided a method for analyzing a correlation for semiconductor chips according to claim 1, wherein the classifying comprises the steps of: sorting the combination data in numeric order of the monitored quantity; and classifying the combination data so that the number of the combination data belonging to end groups is greater than that of other groups.

In general, since the variations among data in the end groups is greater than that of the other groups, with the 4th aspect of the present invention, it is possible to make the reliability of the central values of the respective groups approximately the same than in a case of the 2nd aspect.

In the 5th aspect of the present invention, there is provided a method for analyzing a correlation for semiconductor chips according to claim 2, wherein each of the sets is a wafer unit.

In the 6th aspect of the present invention, there is provided a method for analyzing a correlation for semiconductor chips according to claim 5, wherein each measured value of the monitored quantity is the mean value or median of a physical quantity measured at predetermined portions in the wafer.

In the 7th aspect of the present invention, there is provided a method for analyzing a correlation for semiconductor chips according to claim 4, wherein each of the sets is a wafer unit.

In the 8th aspect of the present invention, there is provided a method for analyzing a correlation for semiconductor chips according to claim 7, wherein each measured value of the monitored quantity is the mean value or median of a physical quantity measured at predetermined portions in the wafer.

In the 9th aspect of the present invention, there is provided a method for analyzing a correlation for semiconductor chips according to claim 1, further comprising the step of determining a regression equation with respect to the combination of the central values of the good or defective ratio and the respective central values of the monitored quantity.

With the 9th aspect of the present invention, it would be possible to grasp at higher certainty the relationship between changes in the monitored quantity and in the good or defective product ratio from the regression equation by the method in which data is classified into groups based on the numeric order of the monitored quantity than by a prior art method in which data is classified into groups based on the numeric order of the yield. With the prior art method, the certainty of the correlation would be low.

In the 10th aspect of the present invention, there is provided a method for analyzing a correlation for semiconductor chips according to claim 1, wherein the method is performed with respect to a plurality of the monitored quantities, the method further comprising the steps of: selecting the monitored quantities whose correlation coefficient are more than a predetermined value and whose absolute inclination value is within a predetermined range; and determining a multiple regression equation with respect to combinations of the central values of the good or defective ratio and the respective central values of the selected monitored quantities.

There is a case where even though it is judged by the prior art method that the correlation between the monitored quantity and the good or defective product ratio is intensive, there is a case where it is judged by a method according to the present invention that the correlation is weak or does not exist. There is a reverse case of the above situation. Taking this into consideration along with effects of the above-mentioned 1st aspect of the present invention, a monitored quantity having a more intensive correlation is selected by the method according to the present invention than by the prior art method, and thereby a more effective multiple regression equation would be obtained.

In the 11th aspect of the present invention, there is provided a method for analyzing a correlation for semiconductor chips as defined in the 1st aspect, wherein the good or defective product ratio is a systematic yield which is obtained by eliminating a random yield resulting from a random cause.

In the 12th aspect of the present invention, there is provided a method for analyzing a correlation for semiconductor chips, comprising the steps of: measuring a geometrically physical quantity of a device in a semiconductor chip and measuring an electrically physical quantity of the semiconductor chip, for each set consisting of a plurality of semiconductor chips, each of the sets being produced under approximately same conditions; classifying data of a combination of the geometrically physical quantity and the electrically physical quantity for each of the sets into a plurality of groups based on numeric order of the geometrically physical quantity; determining central values of the geometrically physical quantity and the electrically physical quantity for each of the groups; and examining a correlation, e.g. calculating a correlatio coefficient or determining a regression equation, between the geometrically physical quantity and the electrically physical quantity.

For example, on the basis of the result of this correlation and results obtained by executing any one of the methods according to the 1st through 9th aspects of the present invention in a case where one of either the geometrically physical quantity or the electrically physical quantity is used as the above-mentioned monitored quantity, the correlation between either one of the geometrically physical quantity or the electrically physical quantity and the good or defective product ratio can be grasped, and the correlation is made clearer.

In the 13th aspect of the present invention, there is provided a semiconductor chip yield adjusting method, comprising the steps of: measuring a physical quantity of semiconductor chips or a state quantity of an apparatus for producing the semiconductor chips as a monitored quantity, the semiconductor chips being produced under approximately same conditions and being divided into sets each of which has a plurality of semiconductor chips; determining substantially a good or defective product ratio for each of the sets; classifying data of combination of the good or defective product ratio and corresponding the monitored quantity into a plurality of groups based on numeric order of the monitored quantity; determining central values of the good or defective product ratio and the monitored quantity for each of the groups; determining a regression equation with respect to the combination of the central values of the good or defective ratio and the respective central values of the monitored quantity; and changing the process conditions based on the regression equation so that the good product ratio would increase.

In the 14th aspect of the present invention, there is provided a semiconductor chip yield adjusting method, comprising the steps of: (1) measuring a physical quantity of semiconductor chips or a state quantity of an apparatus for producing the semiconductor chips as a monitored quantity, the semiconductor chips being produced under approximately same conditions and being divided into sets each of which has a plurality of semiconductor chips; (2) determining substantially a good or defective product ratio for each of the sets; (3) classifying data of combination of the good or defective product ratio and corresponding the monitored quantity into a plurality of groups based on numeric order of the monitored quantity; (4) determining central values of the good or defective product ratio and the monitored quantity for each of the groups; and (5) determining a regression equation with respect to the combination of the central values of the good or defective ratio and the respective central values of the monitored quantity, wherein the steps of (1) through (5) is performed with respect to a plurality of the monitored quantities, the method further comprising the steps of: selecting the monitored quantities whose correlation coefficient are more than a predetermined value and whose absolute inclination value is within a predetermined range; determining a multiple regression equation with respect to combinations of the central values of the good or defective ratio and the respective central values of the selected monitored quantities; and changing the process conditions based on the multiple regression equation so that the good product ratio would increase.

In the 15th aspect of the present invention, there is provided a storage medium having program stored therein, the program comprising the steps of: (1) measuring a physical quantity of semiconductor chips or a state quantity of an apparatus for producing the semiconductor chips as a monitored quantity, the semiconductor chips being produced under approximately same conditions and being divided into sets each of which has a plurality of semiconductor chips; (2) determining substantially a good or defective product ratio for each of the sets; (3) classifying data of combination of the good or defective product ratio and corresponding the monitored quantity into a plurality of groups based on numeric order of the monitored quantity; (4) determining central values of the good or defective product ratio and the monitored quantity for each of the groups; and (5) determining a regression equation with respect to the combination of the central values of the good or defective ratio and the respective central values of the monitored quantity.

In the 16th aspect of the present invention, there is provided a storage medium as defined in the 15th aspect, wherein the steps of (1) through (5) is performed with respect to a plurality of the monitored quantities, the program further comprising the steps of: selecting the monitored quantities whose correlation coefficient are more than a predetermined value and whose absolute inclination value is within a predetermined range; and determining a multiple regression equation with respect to combinations of the central values of the good or defective ratio and the respective central values of the selected monitored quantities.

In the 17th aspect of the present invention, there is provided an apparatus for analyzing a correlation for semiconductor chips, comprising a computer having program installed therein, the program comprising the steps of: (1) measuring a physical quantity of semiconductor chips or a state quantity of an apparatus for producing the semiconductor chips as a monitored quantity, the semiconductor chips being produced under approximately same conditions and being divided into sets each of which has a plurality of semiconductor chips; (2) determining substantially a good or defective product ratio for each of the sets; (3) classifying data of combination of the good or defective product ratio and corresponding the monitored quantity into a plurality of groups based on numeric order of the monitored quantity; (4) determining central values of the good or defective product ratio and the monitored quantity for each of the groups; and (5) determining a regression equation with respect to the combination of the central values of the good or defective ratio and the respective central values of the monitored quantity.

In the 18th aspect of the present invention, there is provided an apparatus as defined in the 17th aspect, wherein the steps of (1) through (5) is performed with respect to a plurality of the monitored quantities, the program further comprising the steps of: selecting the monitored quantities whose correlation coefficient are more than a predetermined value and whose absolute inclination value is within a predetermined range; and determining a multiple regression equation with respect to combinations of the central values of the good or defective ratio and the respective central values of the selected monitored quantities.

Other aspects, objects, and the advantages of the present invention will become apparent from the following detailed description taken in connection with the accompanying drawings.

BRIEF DESCRIPTION OF THE DRAWINGS

FIG. 2 is a diagram illustrating a group classification using a scatter diagram of the monitored quantity X to the systematic yield Ys;

DESCRIPTION OF THE PREFERRED EMBODIMENTS

Figure 1:
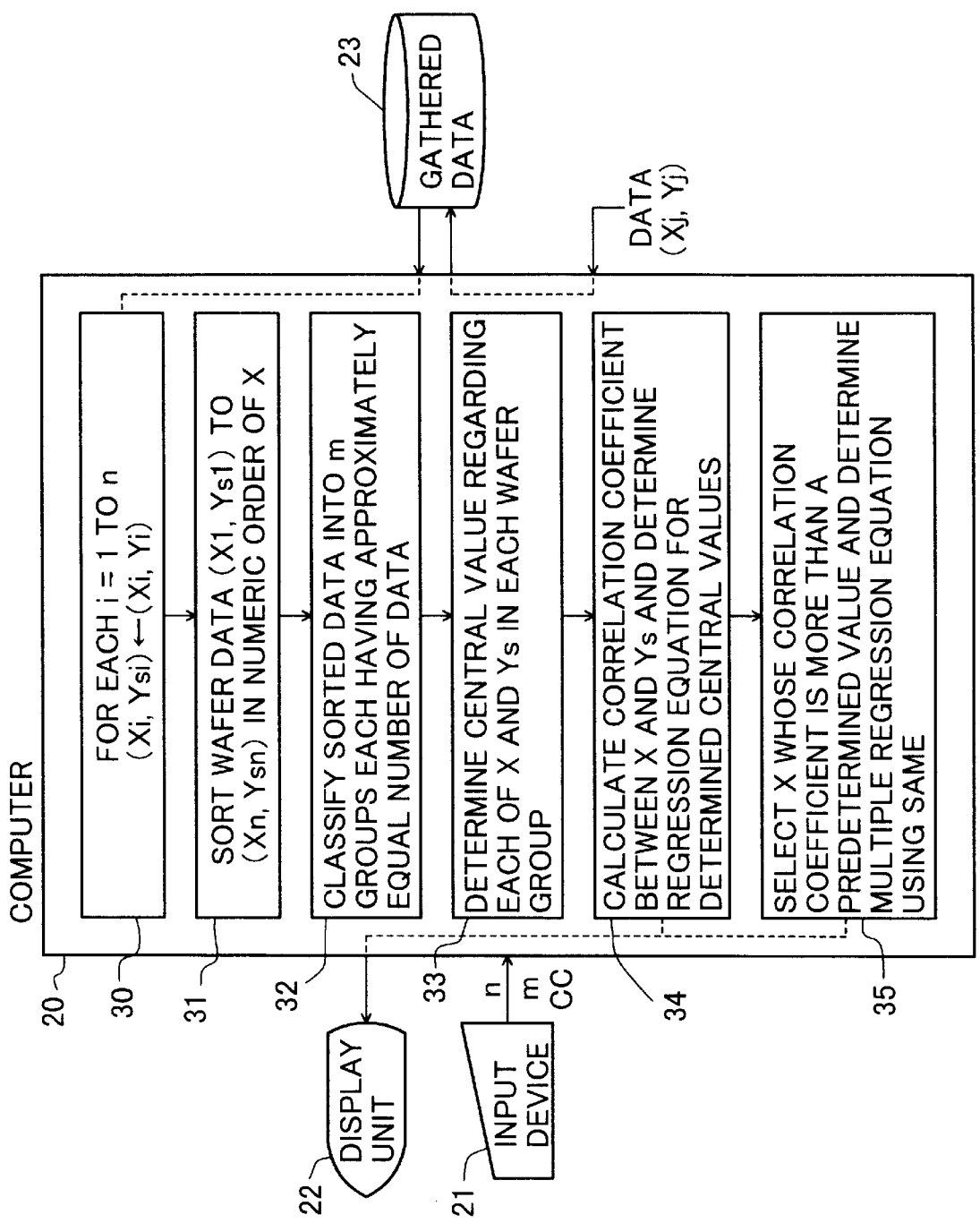
FIG. 1 is a schematic functional block diagram showing a correlation analyzing apparatus for semiconductor chips according to one embodiment of the present invention.

Referring now to the drawings, wherein like reference characters designate like or corresponding parts throughout several views, preferred embodiments of the present invention are described below.

FIG. 1 is a schematic functional block diagram showing a correlation analyzing apparatus for semiconductor chips. This apparatus is a general computer system having a computer 20 to which a input device 20 such as a keyboard and a mouse, display unit 22 and an external storage device 23 are connected.

Semiconductor chips are produced on wafers under approximately same conditions, and j-th wafer data (Xj, Yj) is transmitted from a factory according to its production, where Xj and Yj are values of a and product yield with respect to the j-th wafer, respectively. The data is stored through the computer 20 into the external storage device 23.

The value of monitored quantity X is a central value determined from values monitored for the semiconductor chips on a wafer, for example, the mean value of values obtained by observing and measuring a geometrically physical quantity such as a film thickness or a wiring width at a plurality of predetermined cross-sectional positions of the wafer. The monitored quantity X may be an electrically physical quantity such as a resistance in an electrical test or a signal transmission delay time. Further, the value of monitored quantity X may be a central value determined from values monitored for semiconductor chip producing apparatus, for example, the mean value of the recorded values of instrument for measuring temperature or pressure employed in the producing apparatus, a heating time or a etching time.

When the number of data has reached the set value n imputed from the input device 21, following processes are performed with reading the data gathered to the external storage device 23 into a memory device within the computer 20.

Figure 10:
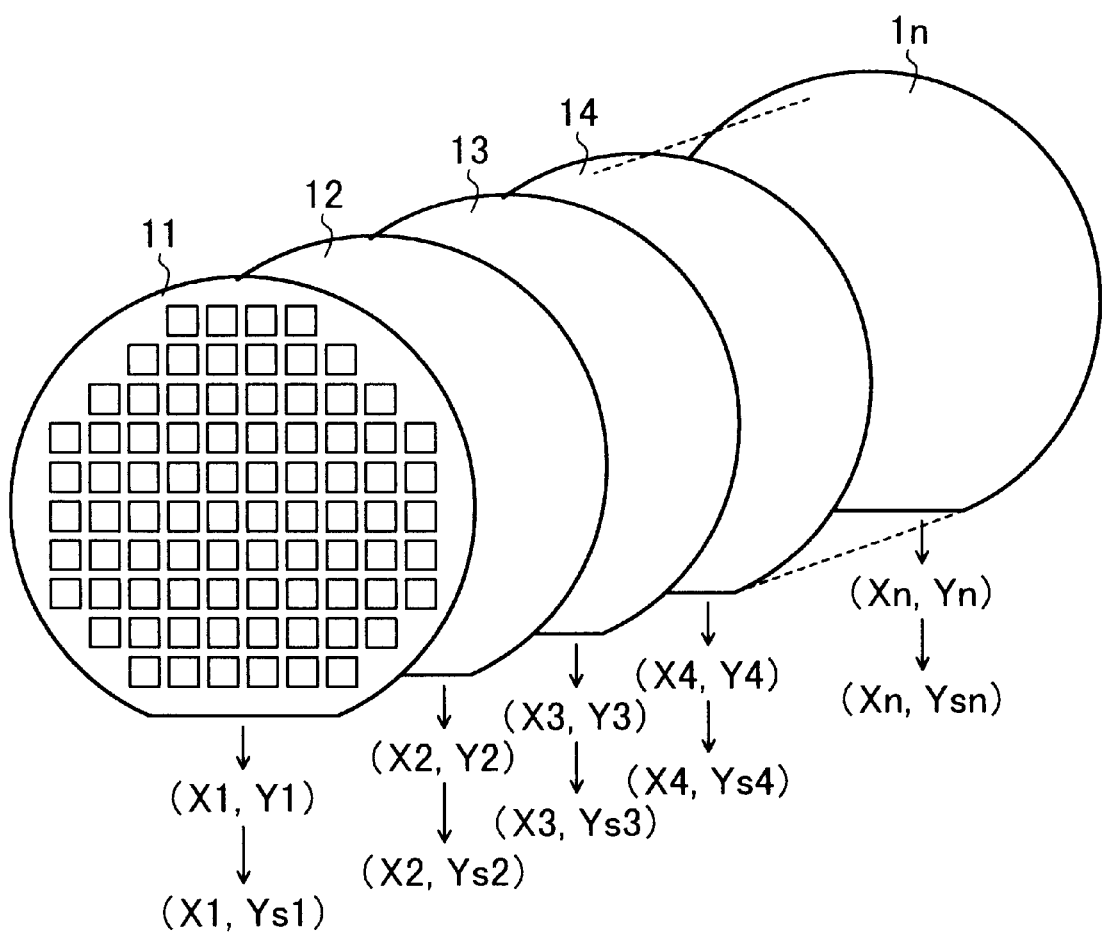
FIG. 10 is a view illustrating statistical data according to the prior art method.
Figure 11A:
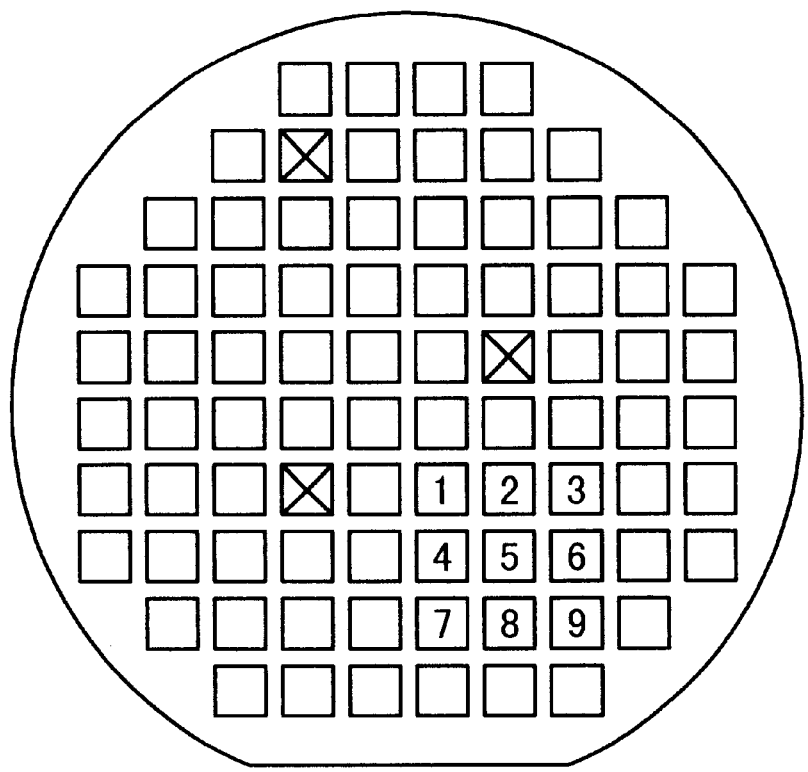
FIG. 11(A) and FIG. 11(B) are views illustrating how to obtain the systematic yield Ys according to the prior art method.
Figure 11B:
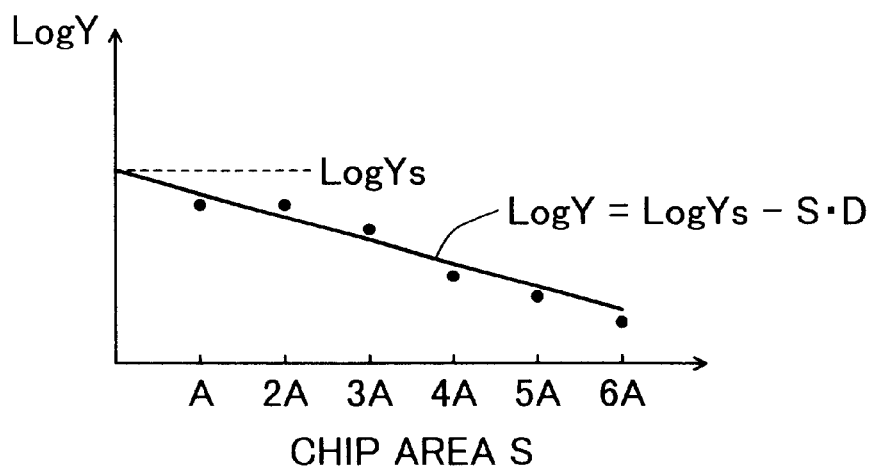
Figure 12:
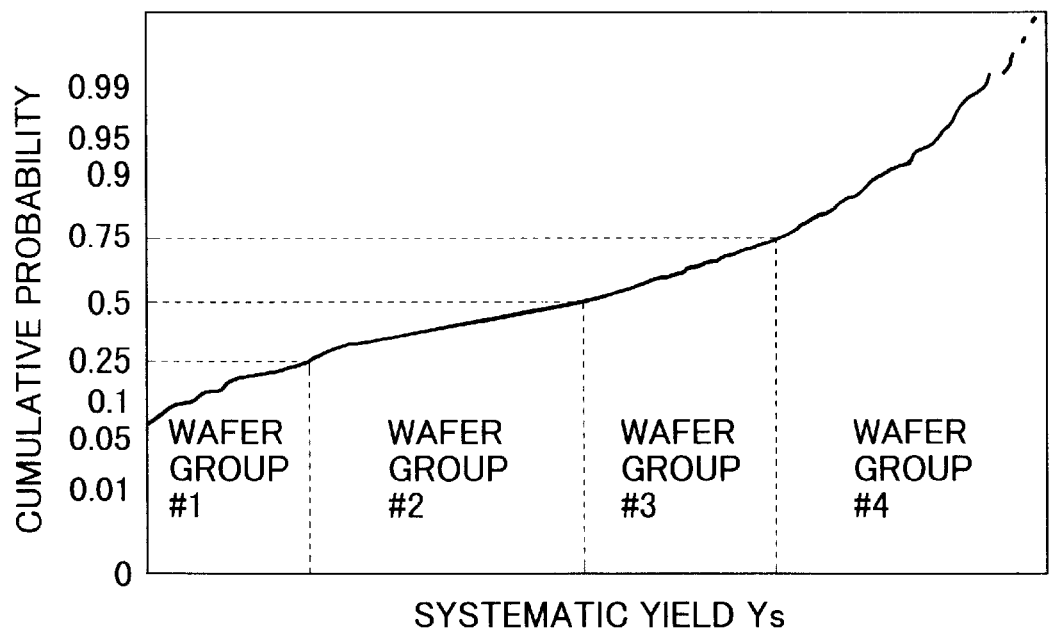
FIG. 12 is a view illustrating the prior art method by which wafer data (X, Ys) in FIG. 10 are classified into four wafer groups after sorting in ascending order of the systematic yield Ys.

(30) A systematic yield Ysi is obtained from the yield Yi for each i=1 through n by the method described above with referring to FIG. 10.

(31) The wafer data (X1, Ys1) through (Xn, Ysn) are sorted in ascending order of the monitored quantity X.

(32) The sorted data is classified into m groups each having approximately equal number of data. The value of m is predetermined by the data from the input device 21. FIG. 2 illustrates the group classification in a case where m=4 using a scatter diagram of the monitored quantity X to the systematic yield Ys. The dotted line which is parallel to the Ys axis is a division line and the number of data in each of wafer groups #1 –#4 is 7 in FIG. 2.

(33) With respect to each of monitored quantity X and systematic yield Ys in each wafer group, a median or average as a central value is determined. When prominent extraordinary data is involved in a group, the median is more preferable than the average. Each point Pk(Xmk, Ysmk), k=1 through 4, shown in FIG. 2 denotes a median combination (a central value of a wafer group).

(34) A correlation coefficient between monitored quantity X and systematic yield Ys is calculated only for the determined central values. If the coefficient is greater than a predetermined value CC inputted from the input device 21, a regression equation of systematic yield Ys with respect to monitored quantity X is determined. RLp in FIG. 2 is the regression line expressing this regression equation.

Figure 13:
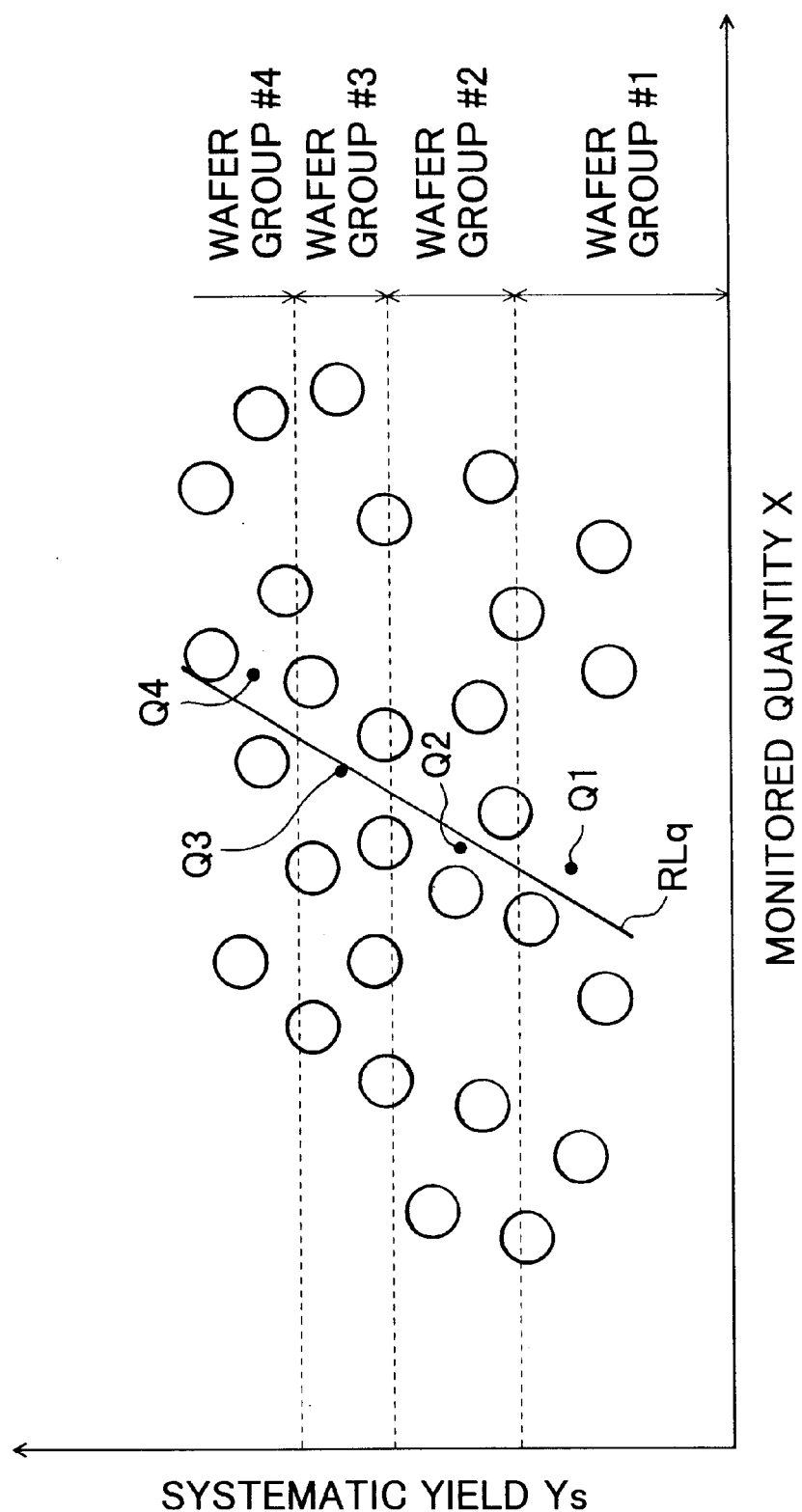
FIG. 13 is a view illustrating the group classification of FIG. 11, which is viewed from the scatter diagram of monitored quantity X to systematic yield Ys.

Since wafer data are classified into groups based on numeric order of monitored quantity X, the relation of the change of systematic yield Ys to the change of monitored quantity X would be able to be grasped in the higher degree of accuracy from the regression line than the case where wafer data are classified into groups based on numeric order of systematic yield Ys as shown in FIG. 13. This is expressed in that the inclination of the regression line RLp is gentler than that of the regression line RLq in FIG. 13. The graph of FIG. 2 and the correlation coefficient are displayed on the display unit 22, and looking this an operator will grasp the above thing.

When the regression line RLp is parallel to the X axis, it is possible to estimate that systematic yield Ys doesn't change even if monitored quantity X changes, therefore it is considered that there is not correlation among them. When the regression line RLp is parallel to the Ys axis, it is possible to estimate that systematic yield Ys isn't decided by the monitored quantity X, therefore it is considered that there is not correlation among them. When the correlation between monitored quantity X and systematical yield Ys is considered to be strong, that is, the correlation coefficient is greater than a predetermined value and moreover the absolute value of the regression line inclination is within a predetermined range, it will be effective to try changing monitored quantity X in order to improve systematical yield Ys.

The processes of the above steps 30 through 34 are performed for a number of monitored quantities.

(35) In a case where the coefficient of the correlation between X and Ys is more than a predetermined value, this X is selected and a multiple regression equation of Ys with respect to only the selected ones is determined.

The selected monitored quantities are displayed on the display unit 22, and the operator will input values of the selected monitored quantities from the input device 21. In response to this, the computer 20 substitutes these values into parameters in the multiple regression equation, calculates the systematical yield Ys and displays the result on the display unit 22.

It should be noted that the above step 30 isn't indispensable since there are cases where stronger correlation values are gotten when the yield Y from which random yield Yr isn't separated is used instead of systematical yield Ys. It would be considered that this is because random yield Yr is gotten from calculation, and the error of defect density D in above formula (1) becomes large when the number of the chips on a wafer becomes small with chip area getting wide, as a result, the error of systematical yield becomes greater than that of yield Y.

Further, wafer data may be classified so as to partially overlap with the data of adjacent groups as will be shown below.

Moreover, the order of regression equation may be equal to or more than 2 as shown below.

Next, practical analysis results obtained by using the above-mentioned apparatus will be described in comparing with those analysis obtained by the prior art method.

As regards FIG. 3 through FIG. 7, a monitored quantity X is the mean value of values obtained by observing and measuring the element size of the corresponding cross-sectional portions of pre-selected three chips on a wafer by SEM, and as regards FIG. 8 and FIG. 9, the monitored quantity X is the mean value of the measured resistance of the word line formed for monitoring at given three points on the wafer. Each of the ordinates in FIGS. 4, 8 and 9 is a systematic yield Ys. However, on the basis of the above-mentioned reasons, each of the ordinates in FIGS. 3 and 5 through 7 is a yield Y. The medians are used as central values in the above-mentioned step 33.

Figure 3A:
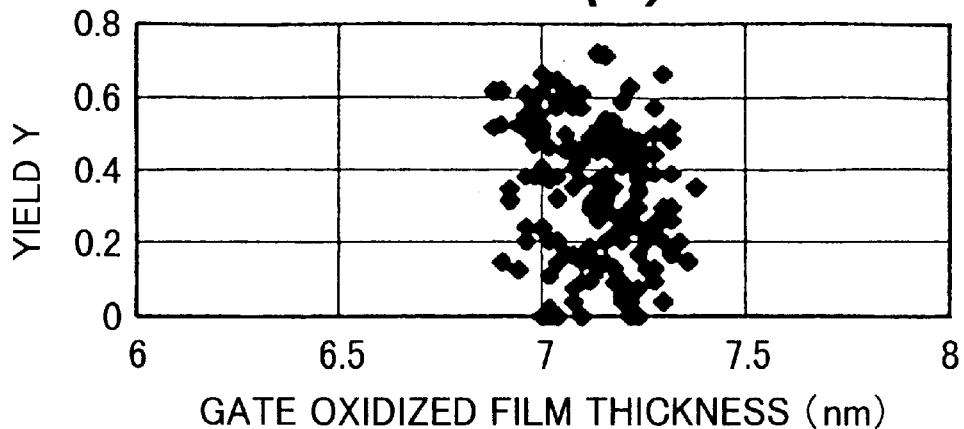
FIG. 3(A) through FIG. 3(C) are scatter diagrams of monitored quantity X to yield Y in a case where the monitored quantity X is a gate oxidized film thickness, wherein each of dots in FIG. 3(A) denotes wafer data, each of those FIG. 3(B) denotes the median of a wafer group according to the present embodiment, and each of those FIG. 3(C) denotes the median of a prior art wafer group.
Figure 3B:
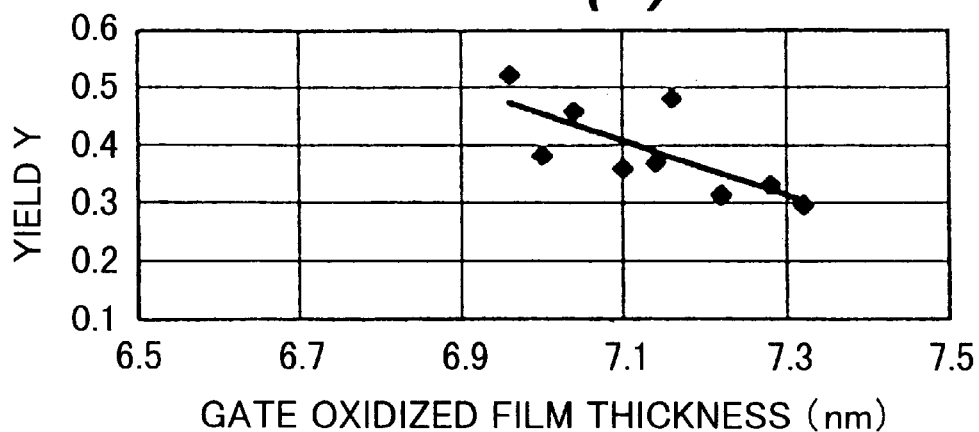
Figure 3C:
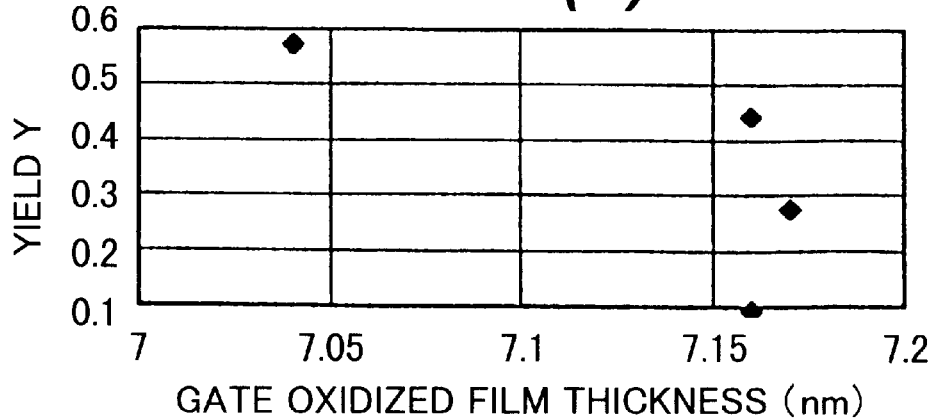

(1) In a case where the monitored quantity X is a gate oxidized film thickness:

Any one of FIG. 3(A) through FIG. 3(C) is a scatter diagram of monitored quantity X to yield Y in a case where X is a gate oxidized film thickness. each of Dots in the drawings is wafer data in FIG. 3(A), the median of a wafer group according to the present embodiment in FIG. 3(B), and the median of a prior art wafer group in FIG. 3(C). The number of dots (number of wafer) in FIG. 3(A) is 172, the number of dots (number of wafer groups) in FIG. 3(B) is 9, and the number of dots (number of wafer groups) in FIG. 3(C) is 4 which is the same as in the above-mentioned literature.

An approximation line (not shown) of only right-side three dots in FIG. 3(C) would be almost parallel to the Y axis. Further, it is clear that the correlation coefficient of four dots is considerably smaller than in a case in FIG. 3(B).

To the contrary, in FIG. 3(B), due to the above-mentioned reasons, the absolute value of inclination of regression line is not too great and not too small, and the correlation coefficient is 0.739 which is comparatively great. It is possible to determine the relationship between changes in the gate oxidized film thickness and in the yield Y at a more reliable certainty than in the prior art.

Figure 4A:
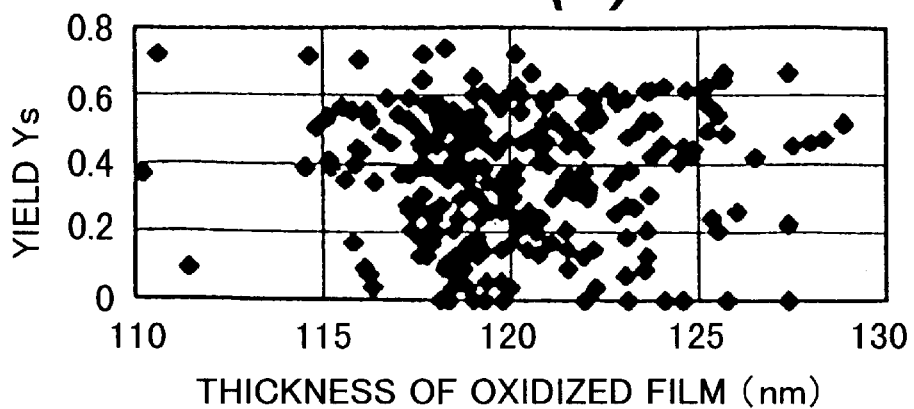
FIG. 4(A) through FIG. 4(C) are scatter diagrams of monitored quantity X to systematic yield Ys in a case where the monitored quantity X is a thickness of oxidized film for forming a side wall, wherein each of dots in FIG. 4(A) denotes wafer data, each of those FIG. 4(B) denotes the median of a wafer group according to the present embodiment, and each of those FIG. 4(C) denotes the median of a prior art wafer group.
Figure 4B:
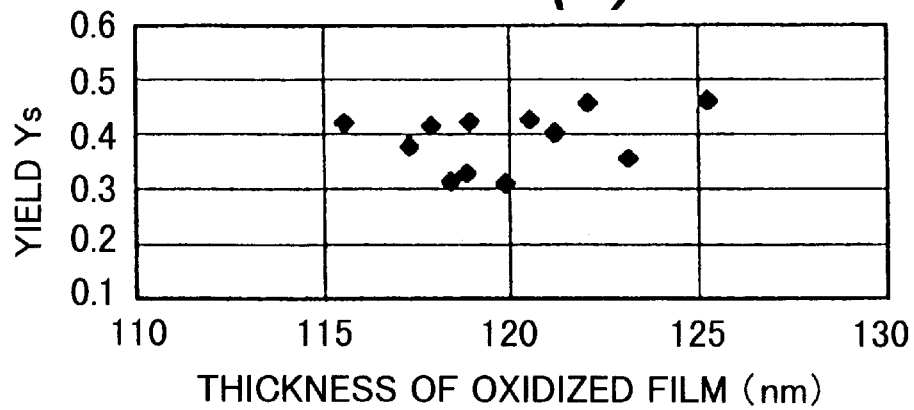
Figure 4C:
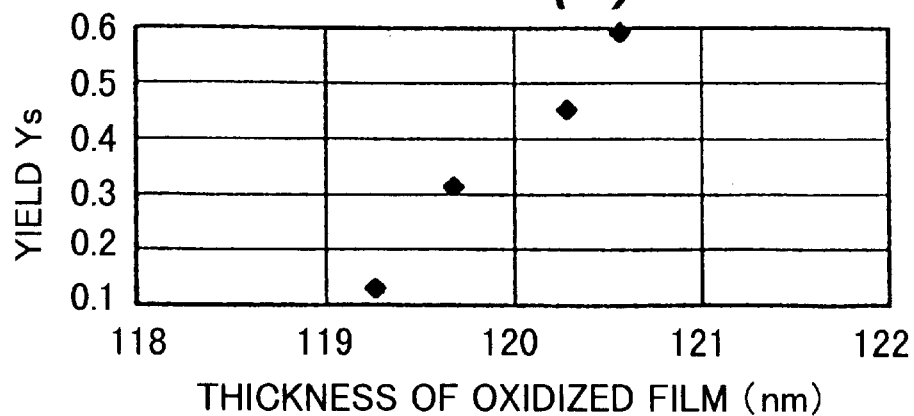

(2) In a case where the monitored quantity X is the thickness of an oxidized film for forming a side wall:

Any one of FIG. 4(A) through FIG. 4(C) is a scatter diagram of monitored quantity X to systematic yield Ys in a case where X is the thickness of an oxidized film for forming a sidewall. Each Dot in the drawings is wafer data in FIG. 4(A), the median of a wafer group of the present embodiment in FIG. 4(B), and the median of a prior art wafer group in FIG. 4(C).

In FIG. 4(C), since the correlation coefficient is considerably great and the inclination of the regression line (not shown) approximating four points is suitable, it seems possible to grasp the relationship between changes in the oxidized film thickness and in the systematic yield Ys.

However, looking at FIG. 4(B), the regression line (not shown) is almost parallel to the X-axis and there is no correlation between the oxidized film thickness and the systematic yield Ys. Also regarding FIG. 4(A), it does not seem that there is such a correlation as shown in FIG. 4(C).

According to the prior art method, although the monitored quantity X may be selected for a multiple regression analysis, this is not selected in this embodiment.

Figure 5A:
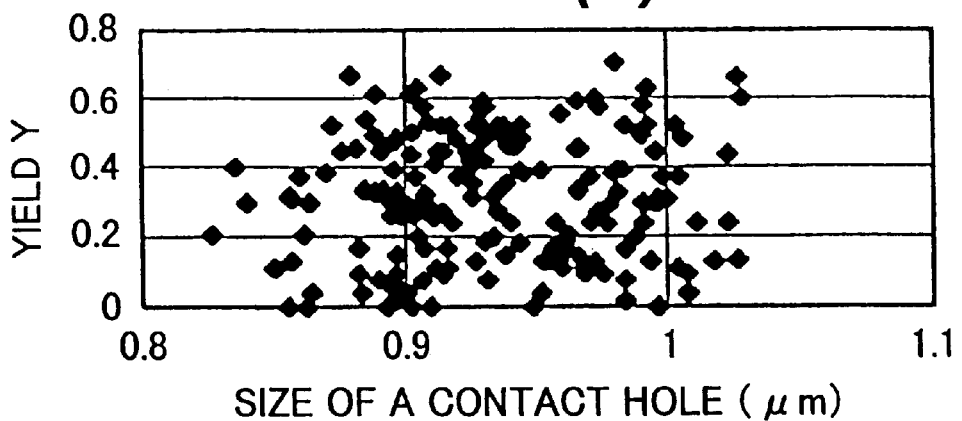
FIG. 5(A) through FIG. 5(C) are scatter diagrams of monitored quantity X to Y in a case where the monitored quantity X is the size of a contact hole between metal and FET's source, wherein each of dots in FIG. 5(A) denotes wafer data, each of those FIG. 5(B) denotes the median of a wafer group according to the present embodiment, and each of those FIG. 5(C) denotes the median of a prior art wafer group.
Figure 5B:
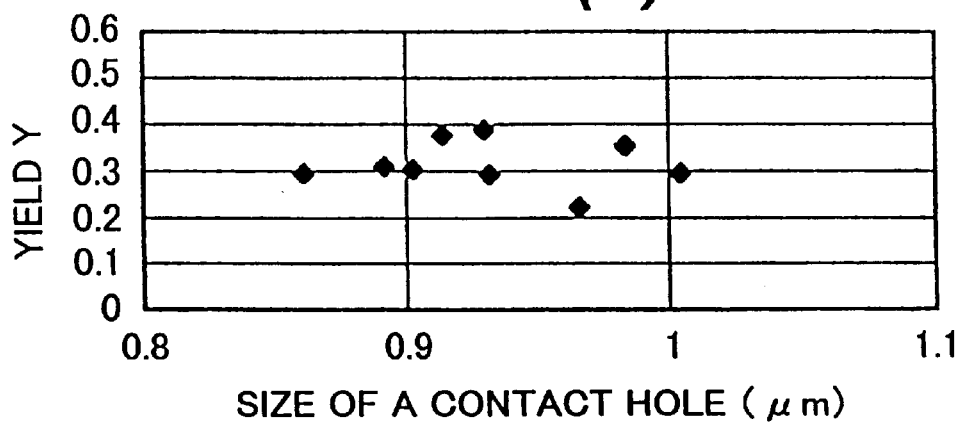
Figure 5C:
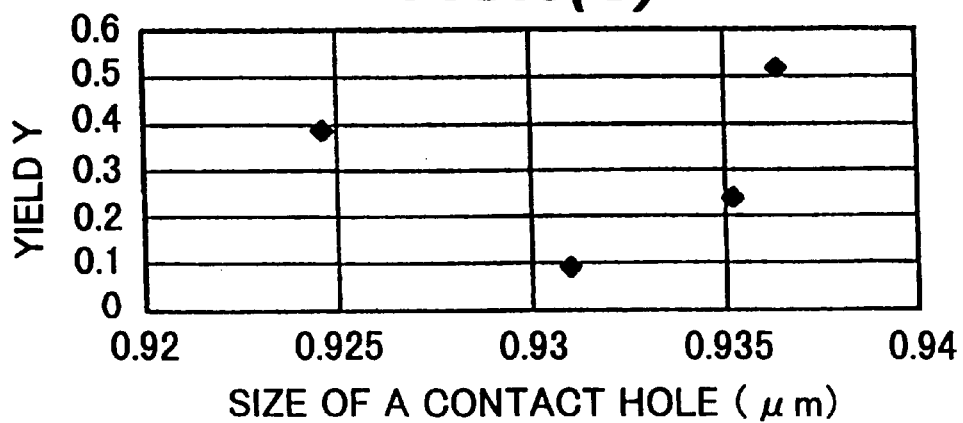

(3) In a case where the monitored quantity X is a size of a contact hole:

Any one of FIG. 5(A) through FIG. 5(C) is a scatter diagram of monitored quantity X to yield Y in a case where X is a side width of a rectangle contact hole between metal and FET's source. Each Dot in the drawings is wafer data in FIG. 5(A), the median of a wafer group of the present embodiment in FIG. 5(B), and the median of a prior art wafer group in FIG. 5(C).

In this example, with either the prior art method or the method according to the present embodiment, there would be no correlation between the size of contact holes and the yield Y.

In this case, the inclination of an approximation line (not shown) of only right-side three dots in FIG. 5(C) is comparatively great. This point is similar to FIG. 3(C).

Figure 6A:
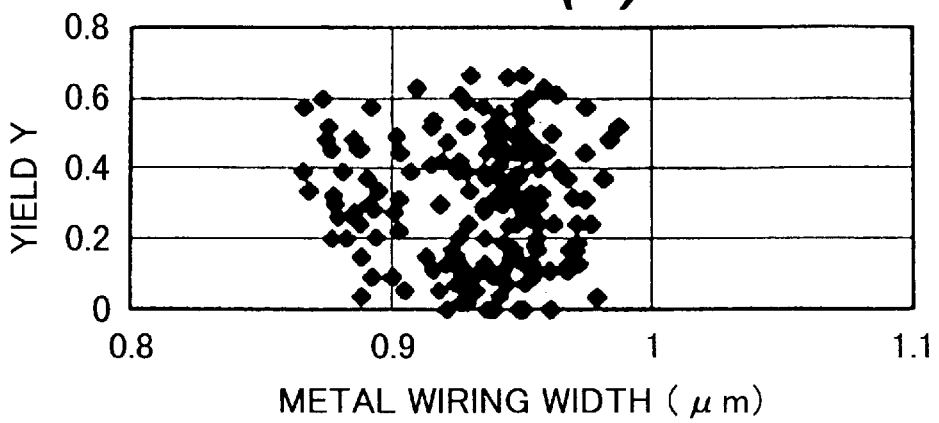
FIG. 6(A) through FIG. 6(C) are scatter diagrams of monitored quantity X to yield Y in a case where the monitored quantity X is a metal wiring width, wherein each of dots in FIG. 6(A) denotes wafer data, each of those FIG. 6(B) denotes the median of a wafer group according to the present embodiment, and each of those FIG. 6(C) denotes the median of a prior art wafer group.
Figure 6B:
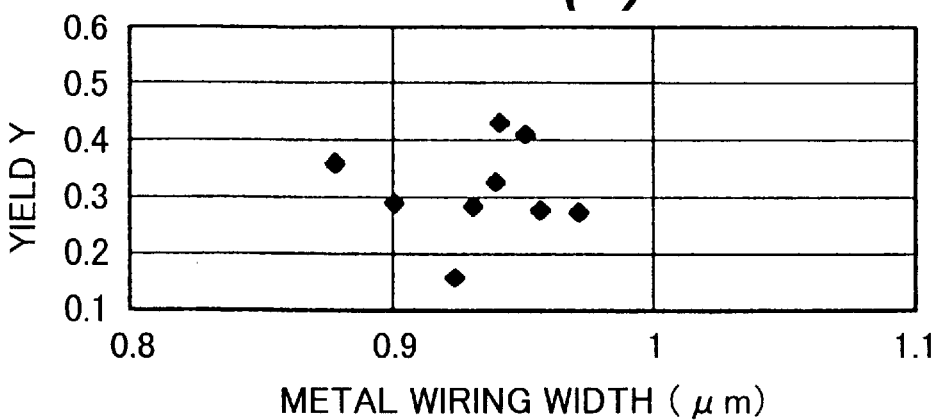
Figure 6C:
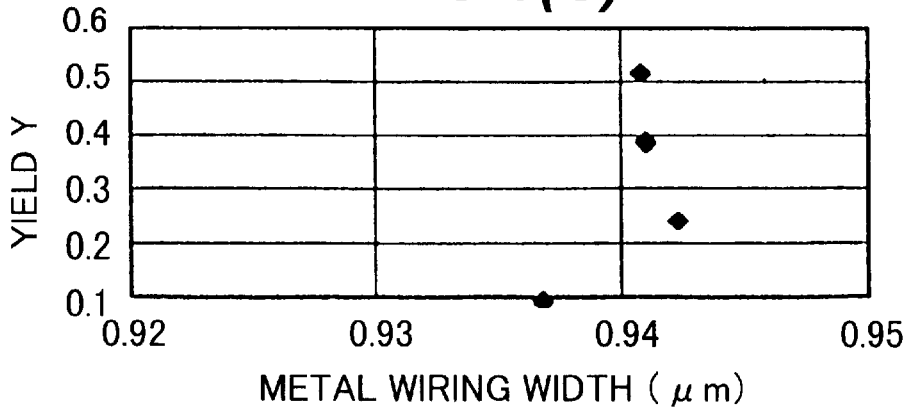

(4) In a case where the monitored quantity X is a metal wiring width:

Any one of FIG. 6(A) through FIG. 6(C) is a scatter diagram of monitored quantity X to yield Y in a case where X is a metal wiring width. Each Dot in the drawings is wafer data in FIG. 6(A), the median of a wafer group of the present embodiment in FIG. 6(B), and the median of a prior art wafer group in FIG. 6(C).

In this example, it is considered that, with either the prior art method or the method according to the present embodiment, there is no correlation between the metal wiring width and yield Y.

In this case, the inclination of an approximation line (not shown) of only right-side three dots in FIG. 6(C) is almost parallel to the Y-axis. This point is also similar to FIG. 3(C).

Figure 7A:
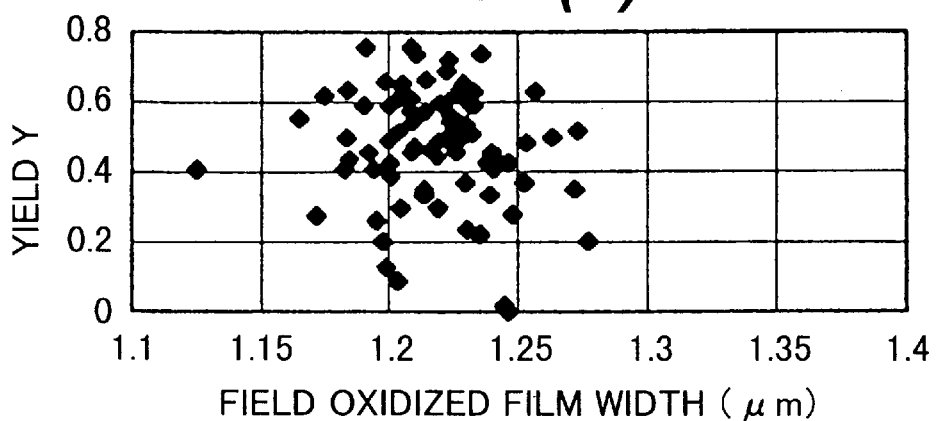
FIG. 7(A) through FIG. 7(C) are scatter diagrams of monitored quantity X to yield Y in a case where the monitored quantity X is a field oxidized film width, wherein each of dots in FIG. 7(A) denotes wafer data, each of those FIG. 7(B) denotes the median of a wafer group according to the present embodiment, and each of those FIG. 7(C) denotes the median of a prior art wafer group.
Figure 7B:
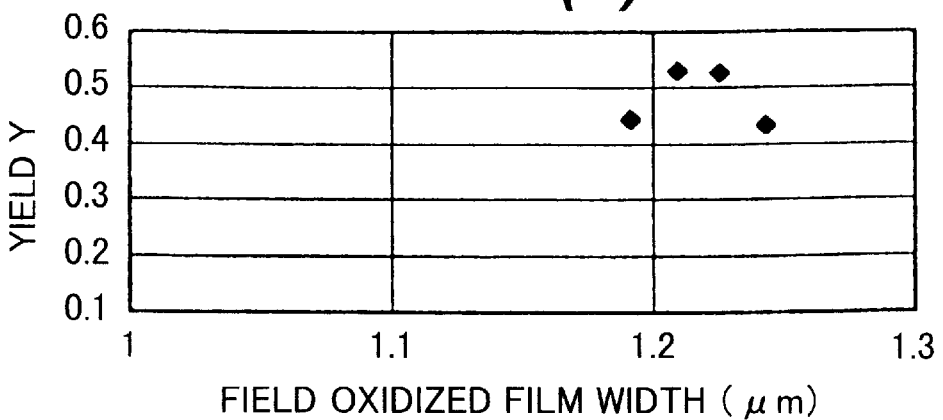
Figure 7C:
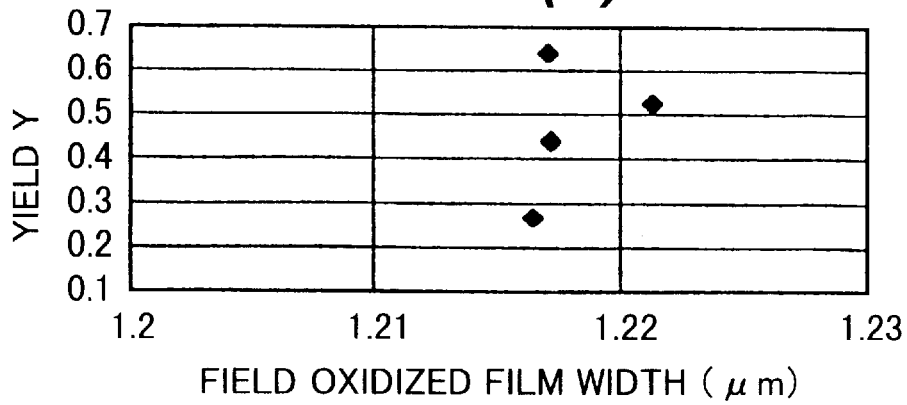

(5) In a case where the monitored quantity X is a field oxidized film width:

Any one of FIG. 7(A) through FIG. 7(C) is a scatter diagram of monitored quantity X to yield Y in a case where X is a field oxidized film width. Each Dot in the drawings is wafer data in FIG. 7(A), the median of a wafer group of the present embodiment in FIG. 7(B), and the median of a prior art wafer group in FIG. 7(C).

In this example, it is considered that, with either the prior art method or the method according to the present embodiment, there is no correlation between the field oxidized film width and yield Y.

In this case, the inclination of an approximation line (not shown) of only right-side three dots in FIG. 7(C) is almost parallel to the Y-axis. This point is also similar to FIG. 3(C).

Figure 8A:
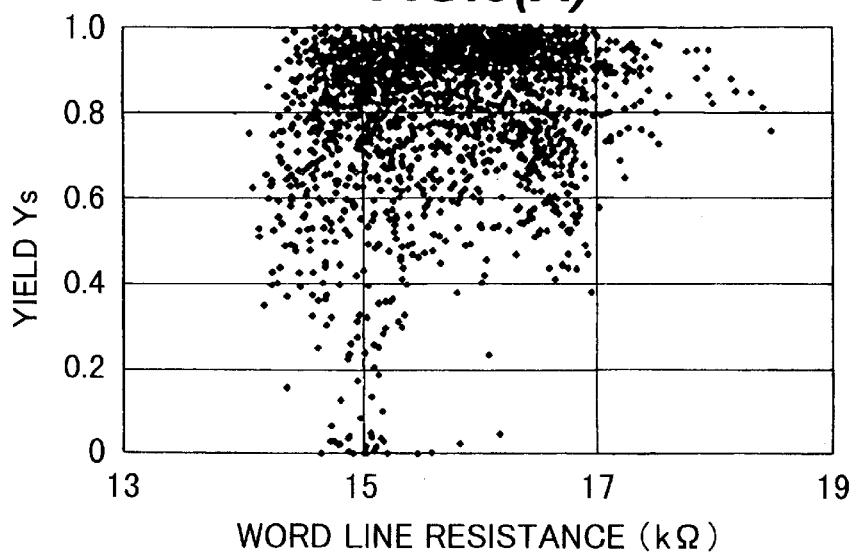
FIG. 8(A) through FIG. 8(C) are scatter diagrams of monitored quantity X to systematic yield Ys in a case where the monitored quantity X is a word line resistance, wherein each of dots in FIG. 8(A) denotes wafer data, each of those FIG. 8(B) denotes the median of a wafer group according to the present embodiment, and each of those FIG. 8(C) denotes the median of a prior art wafer group.
Figure 8B:
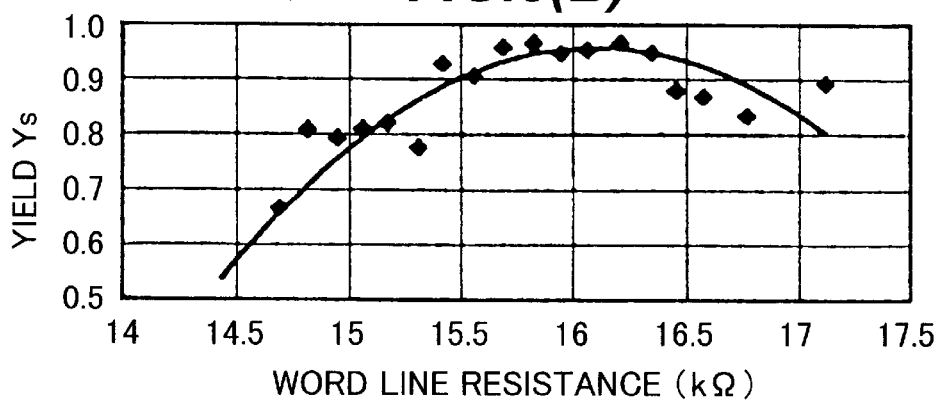
Figure 8C:
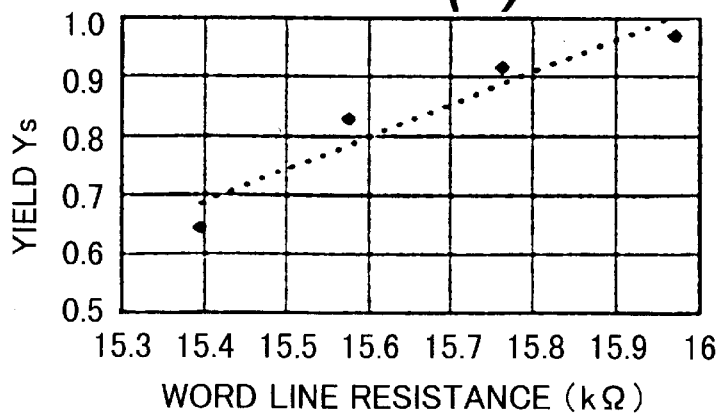

(6) In a case where the monitored quantity X is a word line resistance:

Any one of FIG. 8(A) through FIG. 8(C) is a scatter diagram of monitored quantity X to systematic yield Ys in a case where X is a field oxidized film width. Each Dot in the drawings is wafer data in FIG. 8(A), the median of a wafer group of the present embodiment in FIG. 8(B), and the median of a prior art wafer group in FIG. 8(C). The number of data in FIG. 8(A) is 2,500.

In FIG. 8(B), the correlation coefficient is 0.911, and the regression equation is as follows.

$$Ys = -0.1251X^2 + 3.4708X - 23.149$$

In FIG. 8(C), the correlation coefficient is 0.952, and the regression equation is as follows.

$$Ys = 0.5516X - 7.8066$$

In this example, it is considered that, with either of the prior art method or the method according to the present embodiment, the correlation between the word line resistance and the systematic yield Ys is intensive. However, it is considered that it is possible to determine the relationship between the word line resistance and the systematic yield Ys in more details by the method according to the present invention than by the prior art method. For example, according to FIG. 8(B), it can be presumed that the yield is decreased if the word line resistance exceeds 16 kΩ, but this presumption can not be made with FIG. 8(C).

Figure 9A:
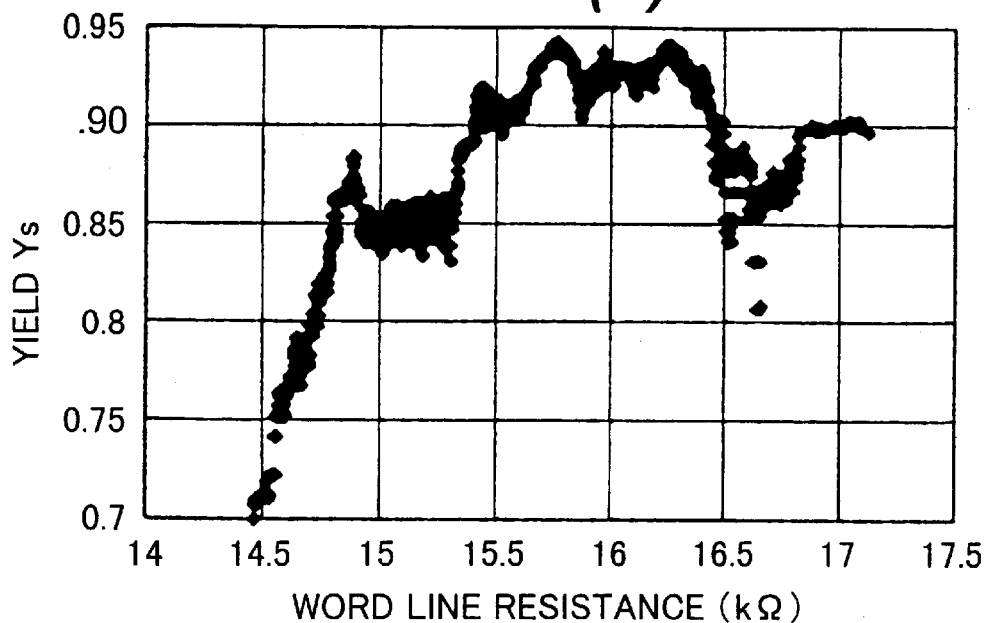
FIG. 9(A) is a scatter diagram of monitored quantity X to systematic yield Ys in a case where the monitored quantity X is a word line resistance, wherein each of dots in the drawings denotes the median of a wafer group in the other group classification of the wafer data in FIG. 9(A)
Figure 9B:
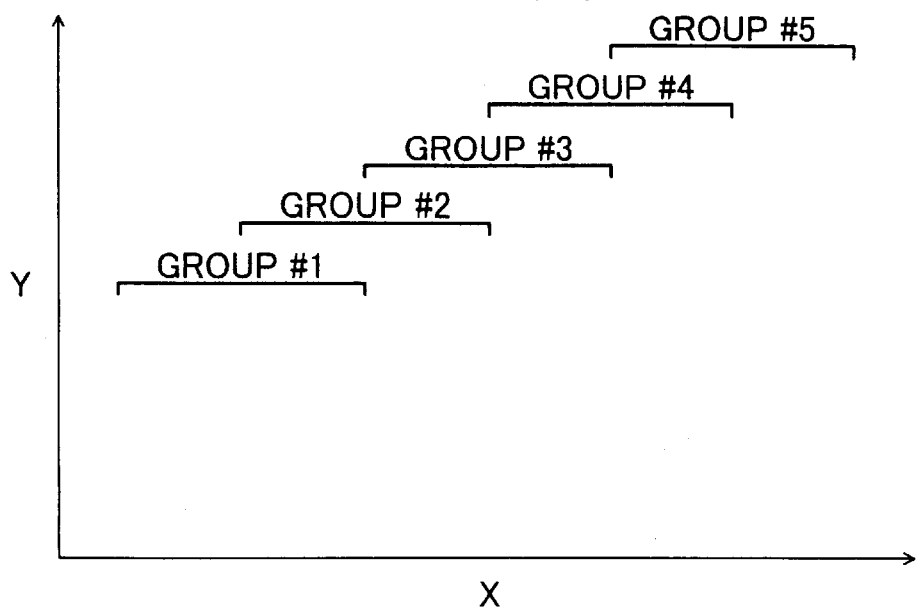
FIG. 9(B) is a view illustrating the group classification in the scatter diagram.

FIG. 9(A) is a scatter diagram of monitored quantity X to systematic yield Ys in a case where X is the word line resistance. Each Dot in FIG. 9(A) is the median of a wafer group in a case where group classification is carried out by the other method. The groups are such that wafer data in FIG. 8(A) are classified so as to partially overlap with data of adjacent groups as shown in FIG. 9(B), wherein the number of data in each group is 100, and the number of data overlapping with its adjacent group is 99. That is, in the data in FIG. 8(A), 100 data from the smaller side of the value X is made into group #1, and (the median of X, the median of Ys) is obtained as the median of this wafer group #1. Next, group #2 is established by eliminating the least value of X from group #1 and adding the value of X coming next to the maximum value of X in group #1, and (the median of X, median of Ys) is obtained as the median of the wafer group #2. Subsequently, processes similar to the above are carried out to get FIG. 9(A).

Thus, the result similar to those of FIG. 8(B) is obtained. Similar results were obtained as regards the other monitored quantities.

From the above description, the following can be concluded.

(i) It would be possible to determine at a higher degree of certainty the relationship between changes in the monitored quantity X and in the yield Y or systematic yield Ys from the regression line by the method according to the present embodiment, in which data are classified into groups in numeric order of the monitored quantity X, than by the prior art method in which data are classified into groups in numeric order of the yield or systematic yield Ys. In the prior art method, the inclinations of the regression lines are too large in general.

(ii) Even though it is judged in the prior art method that the correlation between the monitored quantity X and the yield or systematic yield Ys is intensive, in the method according to the present embodiment, there is a case where the correlation is weak or does not exist.

(iii) Even though it is judged in the prior art method that the correlation between the monitored quantity X and the yield Y or systematic yield Ys is weak or does not exist, in the method according to the present embodiment, there is a case where the correlation is intensive.

Taking the above-mentioned (ii) and (iii) into consideration in combination with (i), monitored quantities having more intensive correlation would be selected in the above-mentioned step 35 in the method according to the present embodiment than in the prior art method, and a more effective multiple regression equation would be obtained.

Although preferred embodiments of the present invention has been described, it is to be understood that the invention is not limited thereto and that various changes and modifications may be made without departing from the spirit and scope of the invention.

For example, representative data (Xj, Yj) of semiconductor chips may be the central value of a plurality of wafers or a lot of wafers.

Further, as is clear from FIGS. 3(A), 4(A), 5(A), 6(A) and 7(A), since the variations among dots at the end portions in the X axis are greater than those at the middle portion, the reliability of the central values of wafer groups at the corresponding end portions would be improved by increasing the number of data in wafer groups at the end portions than that at the other portions, thereby the reliability of the central values of the respective wafer groups would be made approximately the same.

Furthermore, wafer data of a combination of a geometrically physical quantity such as the above-mentioned film thickness or the wiring width and an electrically physical quantity such as the above-mentioned word line resistance may be classified into a plurality of groups after sorting in numeric order of the measured values of the geometrically physical quantity, and central values are obtained for each of the geometrically physical quantity and electrically physical quantity, and regarding these a correlation coefficient between the geometrically physical quantity and electrically physical quantity and regression equations would be obtained. For example, if the results of this correlation are combined with the results of the correlation between the above-mentioned Y or Ys and the geometrically physical quantity X, it is possible to determine the correlation between Y or Ys and the electrically physical quantity, and the correlation can be made more clearer.

Furthermore, instead of yield Y or Ys as a substantial good product ratio, defective ratio (1−Y) or (1−Ys) may be used as a substantial defective product ratio, and further the number of wafers may be used as a substantial ratio.

The present invention is applicable to analyses of the yield or systematic yield Ys of mass products other than semiconductor chips, for example, liquid crystal display panels.

What is claimed is:

1. A method for analyzing a correlation for semiconductor chips, comprising the steps of:
    measuring a physical quantity of semiconductor chips or a state quantity of an apparatus for producing said semiconductor chips as a monitored quantity, said semiconductor chips being produced under approximately same conditions and being divided into sets each of which has a plurality of semiconductor chips;
    determining substantially a good or defective product ratio for each of said sets;
    classifying data of combination of said good or defective product ratio and corresponding said monitored quantity into a plurality of groups based on numeric order of said monitored quantity;
    determining central values of said good or defective product ratio and said monitored quantity for each of said groups; and
    calculating a correlation coefficient between the central values of said good or defective product ratio and the central values of said monitored quantity.

2. A method for analyzing a correlation for semiconductor chips according to claim 1, wherein said classifying comprises the steps of:
    sorting said combination data in numeric order of said monitored quantity; and
    classifying said combination data so that the number of said combination data belonging to each of said groups is approximately equal among said groups.

3. A method for analyzing a correlation for semiconductor chips according to claim 2, wherein each of said groups partially overlaps with adjacent one of said groups.

4. A method for analyzing a correlation for semiconductor chips according to claim 2, wherein each of said sets is a wafer unit.

5. A method for analyzing a correlation for semiconductor chips according to claim 4, wherein each measured value of said monitored quantity is the mean value or median of a physical quantity measured at predetermined portions in said wafer.

6. A method for analyzing a correlation for semiconductor chips according to claim 1, wherein said classifying comprises the steps of:
    sorting said combination data in numeric order of said monitored quantity; and
    classifying said combination data so that the number of said combination data belonging to end groups is greater than that of other groups.

7. A method for analyzing a correlation for semiconductor chips according to claim 6, wherein each of said sets is a wafer unit.

8. A method for analyzing a correlation for semiconductor chips according to claim 7, wherein each measured value of said monitored quantity is the mean value or median of a physical quantity measured at predetermined portions in said wafer.

9. A method for analyzing a correlation for semiconductor chips according to claim 1, further comprising the step of determining a regression equation with respect to the combination of the central values of said good or defective ratio and the respective central values of said monitored quantity.

10. A method for analyzing a correlation for semiconductor chips according to claim 1, wherein said method is performed with respect to a plurality of the monitored quantities, said method further comprising the steps of:
    selecting said monitored quantities whose correlation coefficient are more than a predetermined value and whose absolute inclination value is within a predetermined range; and
    determining a multiple regression equation with respect to combinations of the central values of said good or defective ratio and the respective central values of said selected monitored quantities.

11. A method for analyzing a correlation for semiconductor chips according to claim 1, wherein said good or defective product ratio is a systematic yield which is obtained by eliminating a random yield resulting from a random cause.

12. A method for analyzing a correlation for semiconductor chips, comprising the steps of:
    measuring a geometrically physical quantity of a device in a semiconductor chip and measuring an electrically physical quantity of said semiconductor chip, for each set consisting of a plurality of semiconductor chips, each of the sets being produced under approximately same conditions;
    classifying data of a combination of said geometrically physical quantity and said electrically physical quantity for each of said sets into a plurality of groups based on numeric order of said geometrically physical quantity;
    determining central values of said geometrically physical quantity and said electrically physical quantity for each of said groups; and examining a correlation between said geometrically physical quantity and said electrically physical quantity.

13. A semiconductor chip yield adjusting method, comprising the steps of:
  measuring a physical quantity of semiconductor chips or a state quantity of an apparatus for producing said semiconductor chips as a monitored quantity, said semiconductor chips being produced under approximately same conditions and being divided into sets each of which has a plurality of semiconductor chips;
  determining substantially a good or defective product ratio for each of said sets;
  classifying data of combination of said good or defective product ratio and corresponding said monitored quantity into a plurality of groups based on numeric order of said monitored quantity;
  determining central values of said good or defective product ratio and said monitored quantity for each of said groups;
  determining a regression equation with respect to the combination of the central values of said good or defective ratio and the respective central values of said monitored quantity; and
  changing the process conditions based on said regression equation so that said good product ratio may increase.

14. A semiconductor chip yield adjusting method, comprising the steps of:
  measuring a physical quantity of semiconductor chips or a state quantity of an apparatus for producing said semiconductor chips as a monitored quantity, said semiconductor chips being produced under approximately same conditions and being divided into sets each of which has a plurality of semiconductor chips;
  determining substantially a good or defective product ratio for each of said sets;
  classifying data of combination of said good or defective product ratio and corresponding said monitored quantity into a plurality of groups based on numeric order of said monitored quantity;
  determining central values of said good or defective product ratio and said monitored quantity for each of said groups; and
  determining a regression equation with respect to the combination of the central values of said good or defective ratio and the respective central values of said monitored quantity,
  wherein said steps of through is performed with respect to a plurality of the monitored quantities, said method further comprising the steps of:
  selecting said monitored quantities whose correlation coefficient are more than a predetermined value and whose absolute inclination value is within a predetermined range;
  determining a multiple regression equation with respect to combinations of the central values of said good or defective ratio and the respective central values of said selected monitored quantities; and
  changing the process conditions based on said multiple regression equation so that said good product ratio may increase.

15. A storage medium having program stored therein, said program comprising the steps of:
  measuring a physical quantity of semiconductor chips or a state quantity of an apparatus for producing said semiconductor chips as a monitored quantity, said semiconductor chips being produced under approximately same conditions and being divided into sets each of which has a plurality of semiconductor chips;
  determining substantially a good or defective product ratio for each of said sets;
  classifying data of combination of said good or defective product ratio and corresponding said monitored quantity into a plurality of groups based on numeric order of said monitored quantity;
  determining central values of said good or defective product ratio and said monitored quantity for each of said groups; and
  determining a regression equation with respect to the combination of the central values of said good or defective ratio and the respective central values of said monitored quantity.

16. A storage medium according to claim 15, wherein said steps of through is performed with respect to a plurality of the monitored quantities, said program further comprising the steps of:
  selecting said monitored quantities whose correlation coefficient are more than a predetermined value and whose absolute inclination value is within a predetermined range; and
  determining a multiple regression equation with respect to combinations of the central values of said good or defective ratio and the respective central values of said selected monitored quantities.

17. An apparatus for analyzing a correlation for semiconductor chips, comprising a computer having program installed therein, said program comprising the steps of:
  measuring a physical quantity of semiconductor chips or a state quantity of an apparatus for producing said semiconductor chips as a monitored quantity, said semiconductor chips being produced under approximately same conditions and being divided into sets each of which has a plurality of semiconductor chips;
  determining substantially a good or defective product ratio for each of said sets;
  classifying data of combination of said good or defective product ratio and corresponding said monitored quantity into a plurality of groups based on numeric order of said monitored quantity;
  determining central values of said good or defective product ratio and said monitored quantity for each of said groups; and
  determining a regression equation with respect to the combination of the central values of said good or defective ratio and the respective central values of said monitored quantity.

18. An apparatus according to claim 17, wherein said steps of through is performed with respect to a plurality of the monitored quantities, said program further comprising the steps of:
  selecting said monitored quantities whose correlation coefficient are more than a predetermined value and whose absolute inclination value is within a predetermined range; and
  determining a multiple regression equation with respect to combinations of the central values of said good or defective ratio and the respective central values of said selected monitored quantities.

* * * * *